United States Patent [19]

Shell et al.

[11] 3,843,593

[45] Oct. 22, 1974

[54] RADAR ABSORPTIVE COATING COMPOSITION OF AN ACRYLIC POLYMER, A POLYESTER AND AN ISOCYANATE CROSS-LINKING AGENT

[75] Inventors: Theodore Shell, Swarthmore, Pa.; Joseph A. Vasta, Woodbury, N.J.

[73] Assignee: E. I. du Pont de Nemours and Company, Wilmington, Del.

[22] Filed: June 5, 1972

[21] Appl. No.: 259,677

[52] U.S. Cl. ...... 260/40 R, 117/132 B, 117/132 BE, 117/148, 252/62.56, 260/41 R
[51] Int. Cl. .......................................... C08g 51/04
[58] Field of Search .. 260/31.2 R, 31.2 N, 31.2 XA, 260/32.8 R, 32.8 N, 33.6 R, 40 R, 41 R

[56] References Cited
UNITED STATES PATENTS

| | | | |
|---|---|---|---|
| 2,681,897 | 6/1954 | Frazier et al. | 260/45.2 |
| 3,366,706 | 1/1968 | Vasta | 260/834 |
| 3,375,227 | 3/1968 | Hicks | 260/47 |
| 3,376,271 | 4/1968 | Masters et al. | 260/78.4 |
| 3,551,383 | 12/1970 | Fang | 260/33.6 R |
| 3,558,564 | 1/1971 | Vasta | 260/77.5 |
| 3,585,160 | 6/1971 | Miller et al. | 260/32.8 N |
| 3,622,651 | 11/1971 | Vasta | 260/856 |
| 3,658,763 | 4/1972 | Dehm | 260/31.2 N |

*Primary Examiner*—Leland A. Sebastian

[57] ABSTRACT

A coating composition that forms a durable, flexible radar absorptive coating for aircraft that contains as the binder
   an acrylic graft copolymer having attached to its backbone side chain ester units having reactive hydroxyl groups; a hydroxyl terminated linear polyester of a saturated aliphatic or aromatic dicarboxylic acid and an aliphatic glycol or an olefin oxide having a terminal oxirane group;
an organic polyisocyanate cross-linking agent; and
contains 60–90 percent by weight, based on the weight of the binder, of a carbonyl iron pigment; the composition is particularly useful as a coating on military aircraft which absorbs radar; pigmentation of the binder with iron oxide or chromium oxide pigment provides a coating for magnetic tapes; the binder can also be used as an automotive bumper finish.

6 Claims, No Drawings

RADAR ABSORPTIVE COATING COMPOSITION OF AN ACRYLIC POLYMER, A POLYESTER AND AN ISOCYANATE CROSS-LINKING AGENT

BACKGROUND OF THE INVENTION

This invention relates to a flexible, durable, thermosetting coating composition and in particular to a radar absorbing coating composition for aircraft.

Thermosetting coating compositions are well known in the art and have been widely used for autos, appliances, such as refrigerators, stoves, washers and dryers, air conditioners and the like and also for vending machines. Typical thermosetting coating compositions are shown in Frazier et al. U.S. Pat. No. 2,681,897, issued June 22, 1954; Vasta U.S. Pat. No. 3,366,706, issued Jan. 30, 1968; Hicks U.S. Pat. No. 3,375,227, issued Mar. 26, 1968; Masters et al. U.S. Pat. No. 3,376,271, issued Apr. 2, 1968; U.S. Pat. No. 3,622,651, issued Nov. 23, 1971 and Vasta U.S. Pat. No. 3,558,564, issued Jan. 26, 1971. However, these compositions, particularly when loaded with sufficient iron pigment to absorb radar and applied at high coating thicknesses, do not provide a coating on the plane which is flexible, durable and resistant to elevated temperatures and which will not shatter when the plane is struck by a bullet or flak.

The novel coating composition provides a tough, durable, flexible, shatter resistant, radar absorbing finish for aircraft.

SUMMARY OF THE INVENTION

The coating composition of this invention comprises 10–70 percent by weight of a film-forming binder in an organic solvent;
 wherein the film-forming binder is essentially
 1. a resin blend of 50–85 percent by weight, based on the weight of the resin blend, of a graft copolymer having a backbone of polymerized monomers which are either an aromatic hydrocarbon monomer having vinylene groups, an alkyl acrylate, an alkyl methacrylate, acrylonitrile, methacrylonitrile and mixtures thereof wherein the alkyl groups have 1-8 carbon atoms and has ester groups attached directly to its backbone; these ester groups comprise about 10–75 percent of the total weight of the graft polymer and consist essentially of

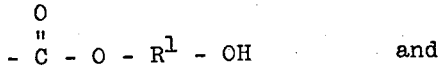

Ester Group (B), which is either

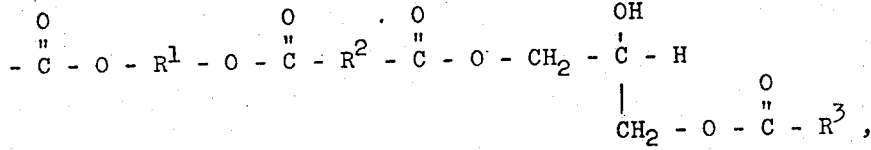

or
 a mixture of these groups;
 wherein the molar ratio of Ester Group (A) to Ester group (B) is from about 1:1.5 to 1:2.5; and wherein $R^1$ is a saturated hydrocarbon radical having 2–10 carbon atoms,
$R^2$ is selected from the group consisting of alkylene, vinylene, aromatic, carbocyclic and heterocyclic radicals,
$R^3$ is selected from the group consisting of a saturated aliphatic hydrocarbon radical having 1 to 26 carbon atoms and an ethylenically unsaturated aliphatic hydrocarbon radical having 12 to 18 carbon atoms, and
15–50 percent by weight, based on the weight of the resin blend of a hydroxyl terminated polyester of
 i. an aliphatic glycol having 2–8 carbon atoms or an olefin oxide having one oxirane group and containing 2–14 carbon atoms, and
 ii. an aromatic dicarboxylic acid or a saturated aliphatic dicarboxylic acid having 4–14 carbon atoms;
wherein the polyester has a weight average molecular weight of 1,000–3,000 and a hydroxyl number of 40–80; and
2. a polyisocyanate wherein the molar ratio of isocyanate to hydroxyl of the resin blend is about 1:1 to about 1:1.25; and
the coating composition contains about 50–90 percent by weight, based on the weight of the film-forming binder of uniformly dispersed carbonyl iron pigment having a particle size of 0.5–15 microns.

DESCRIPTION OF THE INVENTION

Preferably, the novel coating composition of this invention has a binder content of 30–60 percent by weight and the binder comprises a polymer blend of 60–80 percent by weight of the graft copolymer, 20–40 percent by weight of the polyester and the molar ratio of isocyanate to hydroxyl is maintained at 1:1.

The graft copolymer used in this invention utilizes ethylenically unsaturated monomers for the backbone.

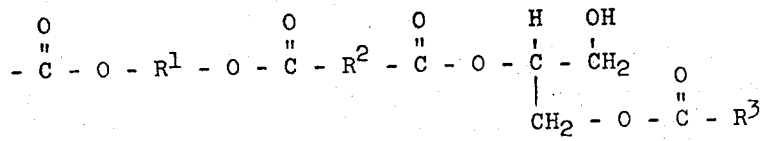

Typical monomers that can be used for the backbone are, for example, aromatic hydrocarbons having vinylene groups, such as styrene, alkyl substituted styrene, such as α-methyl styrene; vinyl toluene; acrylonitrile methacrylonitrile; esters of methacrylic acid and acrylic acid, preferably acrylic esters having 1–8 carbon atoms in the alkyl group, such as methyl methacrylate, ethyl methacrylate, propyl methacrylate, butyl methacrylate, hexyl methacrylate, 2-ethylhexyl methacrylate, and the like, methyl acrylate, ethyl acrylate, propyl acrylate, butyl acrylate, hexyl acrylate, 2-ethylhexyl acrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

Particularly useful monomers or combinations of monomers which form the backbone of high quality polymers of this invention are, for example, styrene, methyl methacrylate, butyl methacrylate, ethyl acrylate, acrylonitrile and methacrylonitrile.

Ester Group (A) of the graft copolymer used in this invention is provided by a hydroxyalkyl substituted vinyl addition monomer, such as hydroxyalkyl methacrylate, a hydroxyalkyl acrylate, a hydroxyalkyl maleate, hydroxyalkyl itaconate, or a mixture of these in which the alkyl group contains 2–10 carbon atoms. The hydroxyalkyl monomer is polymerized with the aforementioned backbone monomers.

Preferred hydroxyalkyl monomers used for forming the graft copolymer used in this invention are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain 2–4 carbon atoms.

Ester Group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming Ester Group (B) has the formula

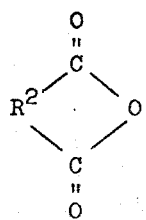

wherein $R^2$ is either alkylene, vinylene, aromatic, carboncyclic or a heterocyclic radical. The anhydride reacts with the hydroxyalkyl monomers and also reacts with the glycidyl ester to form Group (B).

Anhydrides useful in this invention in which $R^2$ is an alkylene group are formed from dicarboxylic acids of the general formula $(CH_2)_n(COOH)_2$ where n is from 2–10. Typical dicarboxylic acids of this group are glutaric, adipic, pimelic, succinic acids and the like. The preferred is an anhydride of succinic acid.

Useful anhydrides in which $R^2$ is a vinylene group are derived from dicarboxylic acids of the general formula

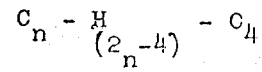

wherein n is from 4–10. Typical dicarboxylic acids of this group are maleic and itaconic acids.

Another group of useful anhydrides are derived from dibasic aromatic acids, such as phthalic acid, uvitic acid and cumidic acid. Often it is desirable to use a halogen substituted anhydride of one of the above aromatic dicarboxylic acids, such as tetrabromo phthalic anhydride. Halogen substituted anhydrides in which the halogen substitutent is either chlorine, bromine or fluorine are particularly useful in forming fire retardant coating compositions.

Anhydrides in which $R^2$ is a carbocyclic radical are useful, such as hexahydrophthalic anhydride, which has the following formula

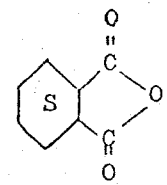

or tetrahydrophthalic anhydride which has the following formula

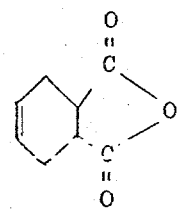

Anhydrides in which $R^2$ is a heterocyclic radical are also useful. One particularly useful compound has the general formula:

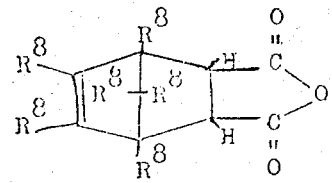

where $R^8$ is either chlorine, bromine or fluorine. The preferred compound is chlorendic anhydride in which $R^8$ is chlorine.

The glycidyl ester used for forming Ester Group (B) has the formula

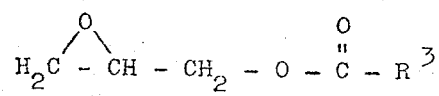

where $R^3$ is a saturated aliphatic hydrocarbon group containing 1–26 carbon atoms, or $R^3$ is an ethylenically unsaturated aliphatic hydrocarbon radical of 12–18 carbon atoms derived from a drying oil fatty acid.

Preferred for use because of the quality of the graft copolymer obtained are esters where $R^3$ is a tertiary saturated aliphatic hydrocarbon group of the structure

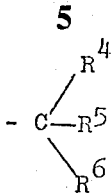

where $R^4$ is $-CH_3$ and $R^5$ and $R^6$ are alkyl groups of 1-12 carbon atoms.

One particularly preferred glycidyl ester of this group because it imparts acid and alkali resistance to the final product is a mixed glycidyl ester described in U.S. Pat. No. 3,275,583, issued Sept. 27, 1966, and is manufactured and sold by the Shell Chemical Company as "Cardura" E ester. This glycidyl ester is of a synthetic tertiary carboxylic acid and has the general formula

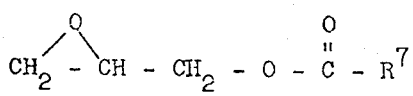

where $R^7$ is a tertiary aliphatic hydrocarbon group of 8 through 10 carbon atoms.

When $R^3$ of the graft copolymer is an ethylenically unsaturated aliphatic hydrocarbon radical of 12-18 carbon atoms, the glycidyl ester is obtained by esterifying the acid chloride of one of the well known drying oil fatty acids, such as oleic acid, linoleic acid, linolenic acid, oleostearic acid and ricinoleic acid with glycidol. These acids are commonly found in tung oil, linseed oil, dehydrated caster oil and soya oil.

The preferred method for forming the above unsaturated glycidyl esters is to react the sodium salt of the fatty acid with epichlorohydrin. The reaction is as follows:

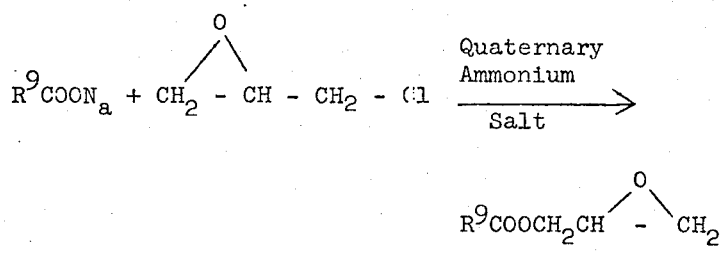

where $R^9$ is from one of the aforementioned drying oil fatty acids.

Preferably, the graft copolymer used in this invention has 30 to 60 percent of its total weight contributed by Ester Group (A) and (B). Also, these groups are present in the graft copolymer at a molar ratio of Ester Group (A) to Ester Group (B) of about 1:1.5 to about 1:2.5 and preferably, in a ratio of about 1:2.

One preferred graft copolymer contains 30 percent by weight styrene, 15 percent by weight methyl methacrylate, 16.5 percent by weight of hydroxyethyl acrylate, 25 percent by weight of "Cardura" E ester and 13.5 percent by weight of phthalic anhydride.

One method for preparing the graft copolymer used in this invention is to first form Ester Group (B) by reacting in about an equal molar ratio the above hydroxyalkyl monomers, the anhydride and the glycidyl ester. This esterification product is then reacted with the backbone monomers and the hydroxyalkyl monomers, which form Ester Group (A), to form the novel polymer of this invention.

As a typical example, a hydroxyalkyl acrylate, aromatic anhydride and a glycidyl ester are charged into a reaction vessel with a suitable solvent, such as toluene, xylene, acetone or an aromatic solvent and the mixture is heated to its reflux temperature, which is about 80° to 200°C., for about 30 minutes to 3 hours. The backbone constituents of the graft copolymer, such as styrene/methyl methacrylate and a hydroxyalkyl acrylate with a suitable polymerization catalyst, such as tertiary butyl peroxide, are then slowly added over a 1-4 hour period. The reaction mixture is heated to its reflux temperature which is about 80° to 200°C. for about 30 minutes to 5 hours, preferably 2-4 hours until a graft copolymer is formed that has the desired molecular weight, which is determined by the relative viscosity as described below. Additional solvent may then be added to dilute the polymer solution.

If the reaction rates of the monomer components used to form the graft copolymer used in this invention are suitable, all of the monomers can be charged into a reaction vessel with a suitable solvent and polymerization catalyst and heated to the reflux temperature which is about 80° to 200°C. for 60 minutes to 5 hours.

Another method of preparing the graft copolymer used in this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1-4 hour period into the reaction vessel while maintaining a reflux temperature which is about 80°-200°C. After the above ingredients have been added, the reaction mixture is maintained at its reflux temperature for an additional 30 minutes to about 5 hours.

Suitable solvents which are used to prepare the graft copolymer used in this invention are toluene, xylene, butyl acetate, acetone, methylisobutyl ketone, methylethyl ketone, and other aliphatic, cycloaliphatic and aromatic hydrocarbons, esters, ethers, ketones and other solvents which are non-reactive with the monomers used to form the graft copolymer such as are conventionally used in coating compositions.

Suitable polymerization catalysts that are used in the process to prepare the graft copolymer are tertiary butyl peroxide, cumene hydroperoxide, azobisisobutyronitrile and the like. To prepare the Ester Group (B) esterification catalysts, such as quarternary bases or salts as benzyltrimethylammonium hydroxide, benzyltrimethylammonium chloride, octadecyltrimethylammonium chloride, or an amine, such as triethylamine, can be used.

The graft copolymer preferably has a relative viscosity of 0.9 to 1.4. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 grams of the polymer in 50 cubic centimeters of ethylene dichloride as the solvent. The efflux times are measured at 25°C. in a standard apparatus, sold under the designation of a modified Ostwald Viscometer.

The polymer solution resulting from the aforementioned process is suitable for direct use in the preparation of the novel coating compositions.

The polyester used in the novel coating composition of this invention preferably is the esterification product of:

1. an aliphatic glycol having 2–8 carbons or an olefin oxide having one oxirane group and containing 2–14 carbon atoms, and
2. an aromatic dicarboxylic acid or a saturated aliphatic dicarboxylic acid having 4–14 carbon atoms.

The linear polyester is hydroxyl terminated, has a weight average molecular weight of 1,000–3,000 and a hydroxyl number of 40–80.

The hydroxyl number is the milligrams of potassium hydroxide required to neutralize 1 gram of polyester resin.

Typically suitable glycols used to prepare the polyester have 2–8 carbon atoms and include ethylene glycol, propylene glycol, 1,3-butane diol, 1,4-butane diol, neopentyl glycol, hexylene glycol and octylene glycol and their equivalents.

An olefin oxide having 2–14 carbon atoms can also be used to prepare the polyester. Typical olefin oxides of this type are ethylene oxide, propylene oxide, butylene oxide, hexylene oxide, octylene oxide, pentylene oxide, decylene oxide, laurylene oxide and the like.

Typical aromatic dicarboxylic acids that are used to prepare the polyesters are phthalic acid, isophthalic acid, terephthalic acid, uvitic acid, cumidic acid and the like.

Typical aliphatic dicarboxylic having 4–14 carbon atoms that can be used to prepare the polyester are succinic acid, glutaric acid, adipic acid, pimelic acid, suberic acid, azelaic acid, sebacic acid, brassic acid and brassylic acid. Preferred are acids that have 4–10 carbon atoms such as succinic acid and azelaic acid.

One preferred polyester which provides a high quality product is the reaction polyester of azelaic acid and butylene oxide having a hydroxyl number of 55–70 and a molecular weight of about 1,400–2,800.

The polyester is prepared according to conventional polymerization techniques well known in the art using conventional solvents and esterification catalysts.

To provide a rapid drying and thermosetting composition, a polyisocyanate is added to the resin blend. The molar ratio of reactive isocyanate groups to hydroxyl group is maintained at about 1:1 to 1:1.25. A variety of polyisocyanates can be used including aliphatic, cycloalphatic, alkaryl aralkyl, heterocyclic and aryl polyisocyanates. The following is a list of useful polyisocyanates:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-dissocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2-2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4-isocyano-phenyl)diethyl silane,
bis-(4-isocyano-phenyl)diphenyl silane,
dichloro-biphenylene diisocyanate, bis-(4-isocyano-phenyl)ethyl phosphine oxide,
bis-(4-isocyano-phenyl)phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(β-isocyano-t-butyl)toluene,
bis-(para-β-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3''-diisocyanoethyl-1,1'-biadamantane,
1,2-bis-(3-isocyano-propoxy)ethane,
2,2-dimethyl propylene diisocyanate, 3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3\ O(CH_2)_2\ O(CH_2)_3\ NCO$,
$OCN(CH_2)_3\ S(CH_2)_3\ NCO$,
$OCN(CH_2)_3\ N(CH_2)_3\ NCO$,
polymethylene polyphenyl isocyanate;
biurets of the formula

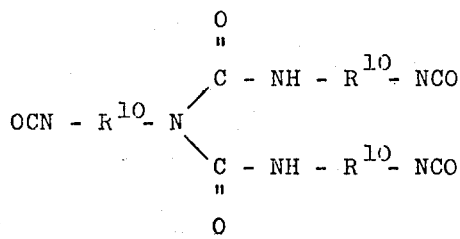

where $R^{10}$ is an alkylene group having 1–6 carbon atoms, especially preferred is the biuret of hexamethylene diisocyanate;

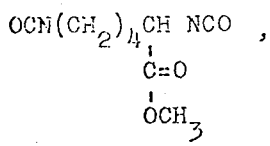

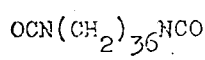

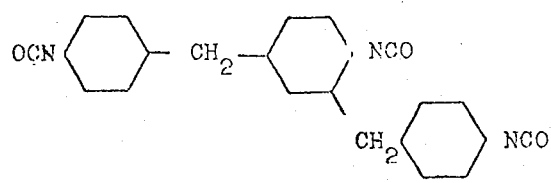

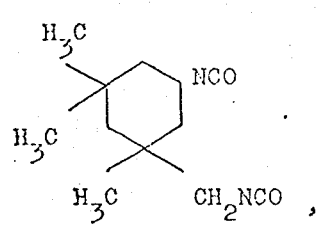

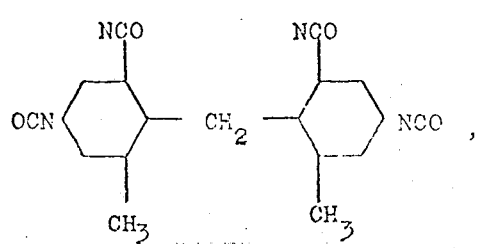

To provide the composition with the electrical properties that will absorb radar, iron pigment formed from carbonyl iron is added in amounts of 50–90 percent by weight of the film-forming binder. Preferably, 60–80 percent by weight of the carbonyl iron pigment is used. The iron pigment is a highly pure form of iron and has a particle size of 0.5 to 15 microns. Preferably, carbonyl iron pigment having a particle size of 6–9 microns is used for the radar absorbing coating.

The iron pigment can be mixed with the graft copolymer solution, the resin blend of the graft/copolymer and the polyester with the polyisocyanate or directly with the composition. Other pigments or colorants can be added provided the electrical properties of the composition are not changed.

Preferably, about 0.01–1.0 percent by weight, based on the weight of the film-forming binder of the novel composition, of a catalyst is added to the coating composition to accelerate cross-linking of the resin blend and the polyisocyanate. Typically useful catalysts are as follows: the organo tin catalysts such as butyl tin dilaurate, dibutyl tin di-2-ethylhexoate; stannous octoate, stannous oleate, and the like; zinc naphthenate, and cobalt naphthenate; vanadium acetyl acetonate, zirconium acetyl acetonate, acetyl acetonate titanate and the like; tertiary amines such as triethylene diamine, triethyl amine and substituted morpholines.

To prevent premature cross-linking which causes gellation of the novel composition, the polyisocyanate is added to the resin blend just before the composition is applied. Also, to reduce settling of the carbonyl iron pigment in the composition, the pigment is mixed into the binder just before application.

The composition can be reduced to an application viscosity using conventional solvents and can be applied by conventional techniques such as spraying, brushing, flow coating, dip coating, coil coating, roller coating and the like. The coating is then air dried after application providing finishes of 0.5–75 mils in thickness. To provide a coating with radar absorbing characteristics, a dried coating of 10–75 mils preferably 20–50 mils is required. These thick coatings are usually applied in several layers allowing the coating to air dry between each layer. The coating can also be baked at about 60°–150°C. to increase the rate of cure of the finish.

The novel coating composition can be applied directly over metal substrates such as steel, aluminum, wood or plastics or the composition can be applied over treated primed or previously painted substrates.

By changing the pigmentation of the novel composition, for example, substituting iron oxide or chromium oxide for the carbonyl iron pigment, provides a composition useful as a coating for recording tapes. The unpigmented composition can be used as a finish for automobile bumpers or as a finish for wood.

The following Examples illustrate the invention. All quantities are on a weight basis unless otherwise indicated.

EXAMPLE 1

A graft copolymer solution is prepared as follows:

| | Parts by weight |
|---|---|
| Portion 1: | |
| Ethylene glycol monoethyl ether acetate | 210.41 |
| VM & P Naphtha | 44.06 |
| Phthalic anhydride | 64.82 |
| Benzyl trimethyl ammonium hydroxide | .02 |
| Portion 2: | |
| Propylene glycol | 141.54 |
| Methyl methacrylate monomer | 72.27 |
| Hydroxy ethyl acrylate monomer | 120.45 |
| "Cardura" E ester (a mixed ester described in U.S. Pat. 3,275,583, issued Sept. 27, 1966, and is a glycidyl ester of a synthetic tertiary carboxylic acid of the formula | |

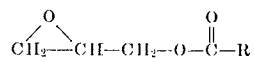

| where R is a tertiary aliphatic hydrocarbon group of 8–10 carbon atoms) | 4.38 |
| Ethylene glycol monoethyl ether acetate | 5.00 |
| Portion 3: | |
| Ethylene glycol monoethyl ether acetate | 5.00 |
| Portion 4: | |
| Ethylene glycol monoethyl ether acetate | 125.35 |
| Total | 876.02 | and

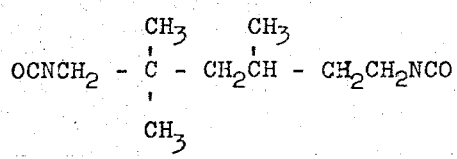

The ingredients of Portion 1 are blended together and charged into a reaction vessel equipped with a stirrer and a reflux condenser. Portion 1 is heated to its reflux temperature. Portion 2 is premixed and slowly added over a 2-hour period to the reaction mixture while the reaction mixture is held at its reflux temperature. Portion 3 is then added and the reaction mixture is held at its reflux temperature for at least 4 hours and continued at reflux until an acid number of 3.5 is reached. Portion 4 is then added and the polymer solution is cooled to room temperature.

The resulting graft copolymer solution has a Gardner Holdt viscosity at 25°C. of U-X, and acid number of 2-4 and a polymer solids content of 54-56 percent. The graft copolymer is the polymerization product of styrene/methyl methacrylate/hydroxyethyl acrylate/ "Cardura" E ester/phthalic anhydride in a weight ratio of 30/15/16.5/25.0/13.5.

A graft copolymer and catalyst solution is prepared by blending together the following ingredients:

|  | Parts By Weight |
|---|---|
| Graft copolymer solution (prepared above) | 400.0 |
| Xylene | 137.7 |
| Catalyst solution (0.2% dibutyl tin dilaurate in ethylene glycol monoethyl ether acetate) | 12.3 |
| Total | 550.0 |

A resin blend solution is prepared by blending together the following ingredients:

|  | Parts By Weight |
|---|---|
| Graft copolymer and catalyst solution (prepared above) | 400 |
| Xylene | 360 |
| Polyester (hydroxy terminated polyester of azelaic acid and butylene glycol having a hydroxyl number of 58-66 and a viscosity at 50°C. of 1275-1810 centipoises) | 240 |
| Total | 1000 |

A coating composition is then prepared by thoroughly blending together the following ingredients:

|  | Parts By Weight |
|---|---|
| Resin blend solution (prepared above) | 100.0 |
| Isocyanate solution (75% solution of the biuret of hexamethylene diisocyanate in ethylene glycol monoethyl ether acetate) | 37.8 |
| Carbonyl iron pigment (particle size 6-9 microns) | 274.0 |
| Total | 411.8 |

An aluminum panel is grit blasted with a No. 80 grit and a wash primer is applied and air dried. The wash primer is a composition of polyvinyl formal and phosphoric acid. Nine coats of the above prepared coating composition are sprayed onto the panel and the panel is baked at 60°C. for 1 hour. Another 9 coats of the above coating composition are applied and the panel is baked at 60°C. for 12 hours and then at 125°C. for 48 hours and then at 200°C. for 1 hour.

The resulting finish is 45 mils thick and has radar absorbing characteristics, excellent flexibility as illustrated by the panel bend test and good adhesion to the metal substrate. When the metal is punctured, the coating adheres to the metal plate and does not shatter or chip away from the point of puncture.

EXAMPLE 2

A coating composition is prepared by blending the following ingredients:

|  | Parts By Weight |
|---|---|
| Resin Blend solution (prepared in Example 1) | 100.00 |
| Isocyanate solution (described in Example 1) | 37.80 |
| Methylethyl ketone | 15.00 |
| Total | 152.80 |

The above ingredients are thoroughly blended together and then sprayed onto a wood gum stick and baked for 60 minutes at about 50°C. The resulting finish is clear, glossy and abrasion resistant.

EXAMPLE 3

A coating composition for a recording tape can be prepared as follows:

|  | Parts By Weight |
|---|---|
| Resin Blend solution (prepared in Example 1) | 100.00 |
| Isocyanate solution (described in Example 1) | 37.80 |
| Iron oxide pigment (recording tape grade) | 260.00 |
| Total | 397.80 |

The above ingredients are thoroughly blended together and then applied to a polyester film in a conventional coating tower using a 200°C. bake for 20 seconds. It is expected that the coated film will form a high quality recording tape.

What is claimed is:

1. A coating composition comprising 10-70 percent weight of a film-forming binder in an organic solvent;

wherein the film-forming binder consists essentially of
1. a resin blend of 50–85 percent by weight of a graft copolymer having a backbone of polymerized monomers selected from the group consisting of polymerized monomers of an aromatic hydrocarbon having vinylene groups, an alkyl acrylate, an alkyl methacrylate, acrylonitrile, methacrylonitrile and mixtures thereof wherein the alkyl groups have 1-8 carbon atoms and having ester groups attached directly to its backbone, said ester groups comprising about 10 to 75 percent of the total weight of the polymer and consisting essentially of Ester Group (A)

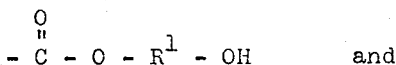

and

Ester Group (B) selected from the group consisting of

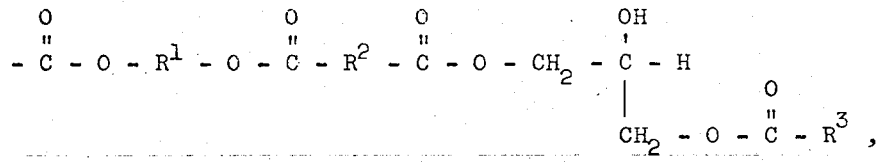

2. a polyisocyanate wherein the molar ratio of isocyanate to hydroxyl of the resin blend is about 1:1 to about 1:1.25; and the coating composition contains about 50–90 percent by weight, based on the weight of the film-forming binder, of uniformly dispersed carbonyl iron pigment having a particle size of 0.5 – 15 microns.

2. The coating composition of claim 1 having a binder content of 30–60 percent by weight and wherein the binder consists essentially of a polymer blend 60–80 percent by weight of the graft copolymer, 20–40 percent by weight of the polyester and the molar ratio of isocyanate to hydroxyl is maintained at 1:1.

3. The coating composition of claim 2 wherein the graft copolymer has a backbone consisting essentially of styrene and an acrylic ester selected from the group consisting of an alkyl methacrylate, an alkyl acrylate and mixture thereof in which the alkyl group contains 1-8 carbon atoms; in which $R^1$ is a saturated hydrocarbon group having 2–4 carbon atoms, $R^2$ is an aromatic radical, and $R^3$ is a tertiary hydrocarbon group having 8 through 10 carbon atoms.

4. The coating composition of claim 2 wherein the polyester consists essentially of

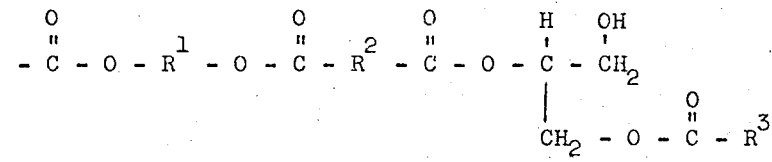

or mixtures thereof, wherein the molar ratio of Ester Group (A) to Ester Group

B. is from about 1:1.5 to 1:2.5;

and wherein $R^1$ is a saturated hydrocarbon radical containing 2–10 carbon atoms;

$R^2$ is selected from the group consisting of alkylene, vinylene, aromatic, carbocyclic and heteroradicals, and $R^3$ is selected from the group consisting of a saturated aliphatic hydrocarbon radical having 1 to 26 carbon atoms and an ethylenically unsaturated aliphatic hydrocarbon radical having 12 to 18 carbon atoms and 15–50 percent by weight, based on the weight of the resin blend of a hydroxyl terminated polyester of i. an aliphatic glycol having 2–8 carbon atoms or an olefin oxide having one oxirane group and containing 2–14 carbon atoms and ii. an aromatic dicarboxylic acid or a saturated aliphatic dicarboxylic acid having 4–14 carbon atoms;

wherein the polyester has a weight average molecular weight of 1,000–3,000 and a hydroxyl number of 40–80; and 1. an aliphatic dicarboxylic acid having 4–10 carbon atoms and 2. an aliphatic glycol having 2–8 carbon atoms.

5. The coating composition of claim 2 in which the polyisocyanate is of the formula

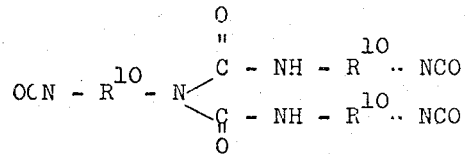

where $R^{10}$ is an alkylene group of 1–6 carbon atoms.

6. The coating composition of claim 2 wherein 1. the resin blend consists essentially of a graft copolymer that has a backbone of styrene and methyl methacrylate and $R^1$ is ethylene, $R^2$ is phenylene and $R^3$ is a tertiary aliphatic hydrocarbon group having 8 through 10 carbon atoms; and a hydroxyl terminated polyester that is the esterification product of azelaic acid and butylene glycol having a hydroxyl number of 58–66; and 2. the polyisocyanate is the biuret of hexamethylene diisocyanate and wherein the carbonyl iron pigment has a particle size of 6–9 microns.

* * * * *

UNITED STATES PATENT OFFICE
CERTIFICATE OF CORRECTION

Patent No. 3,843,593                  Dated October 22, 1974

Inventor(s) Theodore Shell and Joseph A. Vasta

It is certified that error appears in the above-identified patent and that said Letters Patent are hereby corrected as shown below:

Claim 1, column 13, line 26, after the formula delete (,) comma and insert the following:

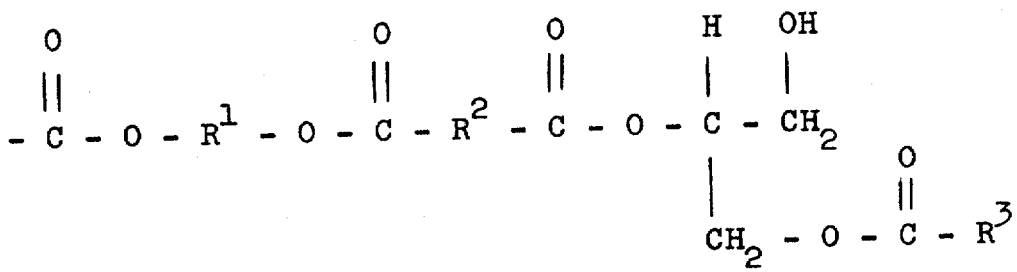

or mixtures thereof, wherein the molar ratio of Ester Group (A) to Ester Group (B) is from about 1:1.5 to 1:2.5;

and wherein $R^1$ is a saturated hydrocarbon radical containing 2-10 carbon atoms;

$R^2$ is selected from the group consisting of alkylene, vinylene, aromatic, carboxyclic and hetero-radicals, and $R^3$ is selected from the group consisting of a saturated aliphatic hydrocarbon radical having 1 to 26 carbon atoms and an ethylenically unsaturated aliphatic hydrocarbon radical having 12 to 18 carbon atoms and

UNITED STATES PATENT OFFICE
CERTIFICATE OF CORRECTION

PO-1050
(5/69)

Patent No. 3,843,593      Dated October 22, 1974

Inventor(s) Theodore Shell and Joseph A. Vasta

It is certified that error appears in the above-identified patent and that said Letters Patent are hereby corrected as shown below:

15-50% by weight, based on the weight of the resin blend of a hydroxyl terminated polyester of (i) an aliphatic glycol having 2-8 carbon atoms or an olefin oxide having one oxirane group and containing 2-14 carbon atoms and (ii) an aromatic dicarboxylic acid or a saturated aliphatic dicarboxylic acid having 4-14 carbon atoms;

wherein the polyester has a weight average molecular weight of 1000-3000 and a hydroxy number of 40-80; and --

Claim 4, column 13, delete lines 53-67 and column 14, delete lines 1-34.

Signed and sealed this 11th day of March 1975.

(SEAL)
Attest:

RUTH C. MASON
Attesting Officer

C. MARSHALL DANN
Commissioner of Patents
and Trademarks